United States Patent [19]

Routt, Jr. et al.

[11] 4,342,511
[45] Aug. 3, 1982

[54] ILLUMINATION SYSTEM HAVING AN EFFICIENT LIGHT GUIDE

[75] Inventors: Wilson M. Routt, Jr., Lexington, Ky.; Danny A. VanHook, Boulder, Colo.

[73] Assignee: International Business Machines Corporation, Armonk, N.Y.

[21] Appl. No.: 179,852

[22] Filed: Aug. 20, 1980

[51] Int. Cl.³ .............................................. G03B 27/00
[52] U.S. Cl. ......................................... 355/1; 362/32; 350/96.27
[58] Field of Search ................. 355/1; 350/96.27, 286; 362/32, 31

[56] References Cited

U.S. PATENT DOCUMENTS

| | | | |
|---|---|---|---|
| 3,232,201 | 8/1963 | Frank et al. | |
| 3,514,200 | 5/1970 | Bowker | 355/1 |
| 3,676,667 | 7/1972 | Malifaud | 362/301 |
| 3,947,106 | 10/1974 | Hamaguchi et al. | 355/1 |
| 3,982,829 | 9/1976 | Hirth | 355/1 |
| 4,128,332 | 2/1976 | Rowe | 355/67 |
| 4,186,431 | 4/1978 | Engel et al. | 362/223 |
| 4,226,523 | 10/1980 | Ovshinsky et al. | 355/1 |

FOREIGN PATENT DOCUMENTS

747917  3/1944  Fed. Rep. of Germany .

OTHER PUBLICATIONS

A book entitled "Modern Optical Engineering", by Smith, W. J., Chapter 8, 1966.
A paper entitled "Narrow Beam Fluorescent Sources-Design and Applications", by Levin, R. E., et al, presented at the National Technical Conference of the Illumination Engineering Society, 1967, Montreal, Canada.
A doctrinal dissertation entitled "The Computation of Fixed Points", by Wilmuth, R. J., Dept. of Operations Research, Stanford University, Jul. 1973.
A book entitled "Introduction to Linear and Nonlinear Programming", by Luenberger, D. C., Addison-Wesley, Massachusetts, 1973.
IBM Technical Disclosure Bulletin article entitled "Optical System for Character Recognition" to W. E. Goetz, et al, vol. 6, No. 8, Jan., 1964, p. 122.

*Primary Examiner*—Monroe H. Hayes
*Attorney, Agent, or Firm*—J. Jancin, Jr.; Homer L. Knearl; Yen S. Yee

[57] ABSTRACT

An illumination system for a document scanner comprising a fluorescent lamp for illuminating a document to be scanned and an efficient light guide which "pipes" the light to the target document area. The fluorescent lamp has an aperture defined by an aperture angle wherein the lamp radiance is determined by the aperture angle. The light guide has a trapezoidal longitudinal cross section. An input window associated with the narrow base of the trapezoidal shape light guide is coupled to the aperture of the lamp. An output window associated with the wide base of the trapezoidal shape light guide is directed to the document area. The design of the illumination system includes having the magnitudes of the guide angle, the scan distance, the narrow base, the wide base, and the length of the light guide optimized so as to maximize the product of the lamp radiance and the solid angle subtended by the wide base from points inside the document area, whereby the amount of light delivered to the document area is maximized.

3 Claims, 8 Drawing Figures

ILLUMINATION SYSTEM HAVING AN EFFICIENT LIGHT GUIDE

TECHNICAL FIELD

This invention relates generally to an illumination system for a document scanner of the type used in copiers or facsimile machines, and more particularly, to an efficient light guide device therefor which delivers more light to a target document area.

BACKGROUND ART

Modern copiers and facsimile machines feature more compact designs than such devices heretofore. The compactness requirement in such machines raises packaging problems including problems of heat dissipation. More particularly, the limited available space in the vicinity of the document scanner glass contributes to the need for innovative and energy efficient illumination system.

On the one hand, it is desirable to use a fluorescent light source because it is energy efficient and operates at a low temperature. On the other hand, the length and bulkiness of a fluorescent lamp contribute to a configuration problem because of the space-limited environment typically encountered in such compact machines. A design solution is to place the bulky fluorescent lamp at a suitable position away from the document scanner glass, where space or heat dissipation may be less of a problem, and guide or "pipe" the light to the congested document scanner glass area using a light guide.

In order to provide sufficient illumination to a target document area, multiple sources of illumination having multiple light guides may be needed, or an optimized illumination system having an efficient light guide may be required. However, the use of multiple light sources and the associated light guides needed tends to contribute to the aforesaid space congestion problem. An optimized illumination system requiring only one efficient light guide and a single high intensity light source, which provides adequate illumination to the target document area, would be a far more cost-effective realization.

Some prior illumination systems provide such multiple light sources having multiple light guides. For instance, U.S. Pat. No. 3,947,106 to Hamaguchi et al discloses an illumination package for a copier having two light guides and two associated light sources for providing illumination to the document area to be scanned.

The described light guides have output windows directed to the document area, and input windows, which are wider than their respective output windows, each adjacent its fluorescent light source, respectively. This choice of the light guide orientation, contrary to intuition, does not produce light concentration or deliver more light. In fact, because of the wide input window, this orientation requires a fluorescent lamp with a large aperture angle, which tends to reduce source radiance and results in a reduction in overall document area irradiance.

In addition, employment of a reflective coating on the outside walls of light guide, as described, also contributes to reflection and transmission losses.

A prior illumination device employing a single light guide for use in photocopiers is described in U.S. Pat. No. 4,128,332 to Towe. It employs an internal reflecting light conduit and a light source to illuminate at least one of two input ends of the light conduit. The longitudinal surface of the light conduit has a coating arranged in desired geometry to allow the escape of light from the conduit in accordance with the geometry to illuminate a desired document area. There is no teaching of either the use of an apertured light source having a critical aperture angle or means to maximize document illuminance.

Another illumination device for document scanning is described in U.S. Pat. No. 4,186,431 to Engel. It employs a cylindrical elongated incandescent lamp positioned within a tubular light reflecting member having a line light diffuser strip window. A narrow beam of light emitted through the diffuser strip window is projected onto the document by a cylindrical lens. There is no teaching of a light conducting means having an output window at one end and a relatively narrower input window at the other end and being oriented so that the narrower input window is adjacent the aperture of the light source and the output window is directed to the document area to be scanned, whereby the document irradiance is increased.

DISCLOSURE OF INVENTION

It is a principal object of this invention to provide an improved illumination system for a document scanner.

It is another principal object of this invention to provide an efficient light guide for a document scanner, which delivers more light to the document to be scanned.

It is another object of this invention to provide an improved document scanner illumination system which maximizes document illuminance.

It is still another object of this invention to provide a compact illumination apparatus for use in a copier or facsimile machine.

It is also an object of this invention to provide an illumination apparatus which consumes a low level of energy and generates minimum heat.

In accordance with the teachings of this invention, an illumination apparatus for a document scanner is provided which includes an apertured fluorescent lamp for providing illumination for a document to be scanned, and a light conducting means for guiding light emitted from the aperture to an area of the document to be scanned. The light conducting means includes an output window at one end and a relatively narrower input window at the other end. The light conductng means is oriented so that the input window is adjacent to the aperture of the fluorescent lamp and the output window is directed towards the document area.

The foregoing and other objects, features and advantages of this invention will be apparent from the following more particular description of the best mode for carrying out the invention, as illustrated in the accompanying drawing.

BRIEF DESCRIPTION OF DRAWINGS

The details of the invention will be described in connection with the accompanying drawings, in which:

FIG. 3b is a cross sectional view of the aperture fluorescent lamp shown in FIG. 3a.

FIG. 3c illustrates the relative aperture irradiance as a function of the aperture angle for the aperture fluorescent lamp of FIG. 3a.

BEST MODE FOR CARRYING OUT THE INVENTION

Figure 1A:
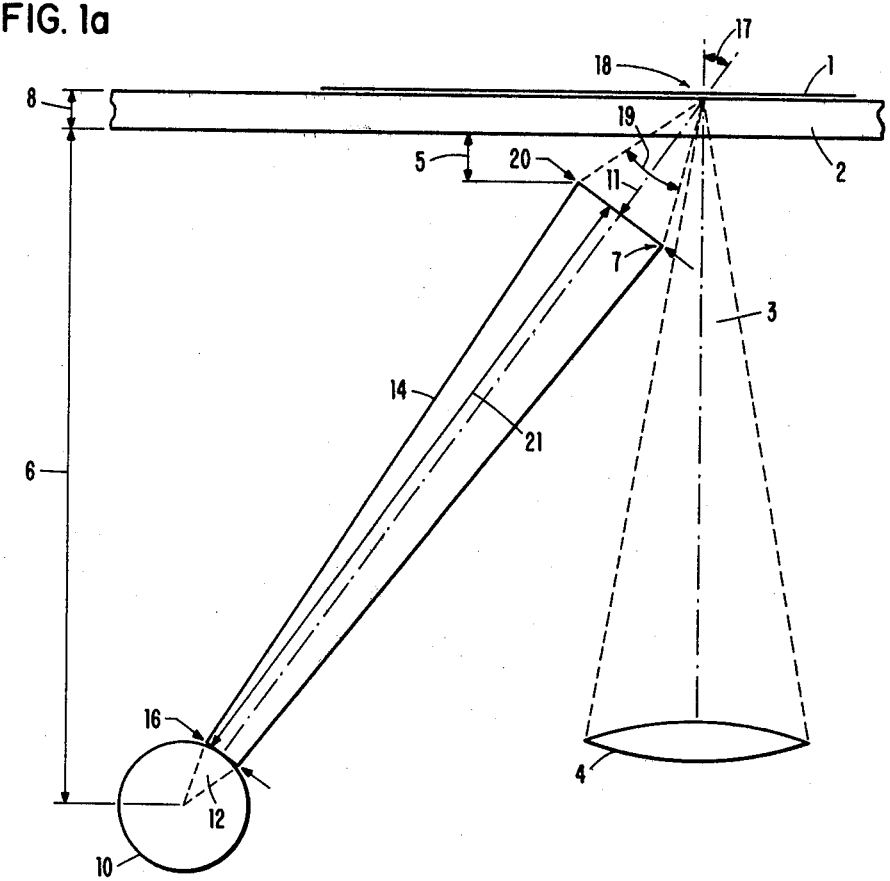
FIG. 1a is a schematic diagram of an illumination system according to the invention.

Referring to FIG. 1a, fluorescent lamp 10 has an aperture 12 from which light is emitted to an adjacent light guide 14. Light guide 14 conducts light to an area near a transparent document support bed (e.g., glass) 2 to illuminate document 1 to be scanned. The document 1 is read through viewing cone 3 of lens 4.

Figure 2A:
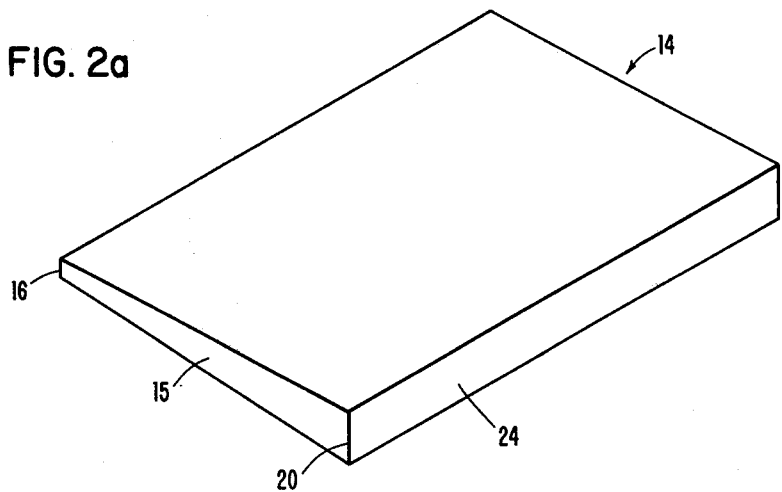
FIG. 2a is a perspective view of the light guide seen from the light output side thereof.
Figure 2B:
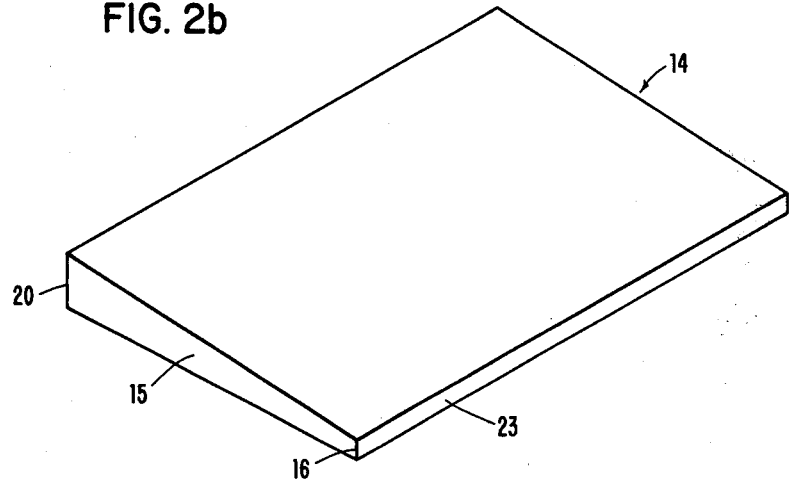
FIG. 2b is a perspective view of the light guide seen from the light input side thereof.
Figure 3A:
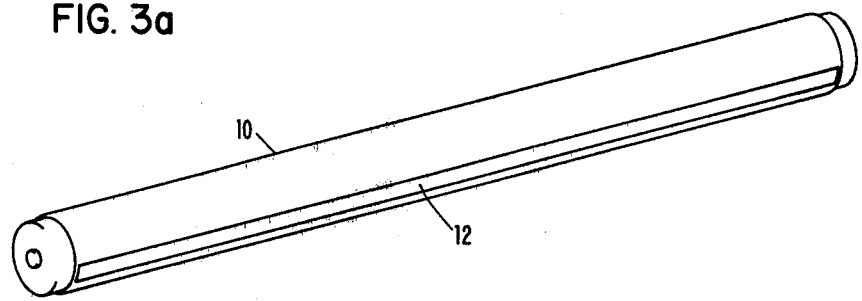
FIG. 3a is a schematic illustration of an aperture fluorescent lamp.
Figure 3B:
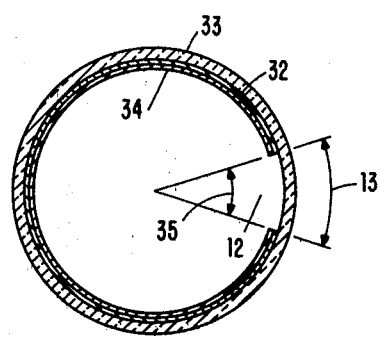

Referring to FIGS. 2a and 2b, the light guide 14 features a trapezoidal cross section 15. The width of the narrow base 16 of the trapezoidal shape is slightly smaller than the width of the aperture 12 (see also FIG. 1a) as represented by the arcuate distance 13 (FIG. 3b). This arrangement ensures that aperture 12 always covers input window 23 and permits uniform illumination of the output window 24 as viewed from the document area 18 (FIG. 1a). The output window 24 associated with the wide base 20 of the trapezoidal shape 15 is directed towards the area 18 to be scanned.

Light guide 14 can be made of glass or acrylic plastic or other transparent material having an index of refraction greater than that of air. As to be described hereinafter, with good surface quality and proper light guide design, light traverses the guide 14 substantially by total internal reflection, and reflective coating on the outside walls of guide 14 is not needed. In fact, a reflective coating having an index of refraction higher than that of air would lead to loss of light.

A near optimum illumination system according to the present invention, as will be described in detail hereinafter, includes a light guide 14 having a trapezoidal cross section 15 wherein the input window 23 is coupled to aperture 12 of fluorescent lamp 10, and the output window 24 is directed towards the document area 18 to be scanned. In order to maximize the amount of light delivered, design parameters as illustrated in FIG. 1a, including narrow base 16, wide base 20, the scan distance 11, the guide angle 17 and the length 21 of the light guide 14 are optimized so as to maximize the product of the source radiance and the solid angle 19 subtended by wide base 20 from points in document area 18. These optimization parameters are, as described hereinafter, interrelated and are mostly constrained by the specific machine components layout.

PLANAR LIGHT SOURCE AND TARGET RELATION

Before describing the design of this illumination system, an explanation of the physical principles involved will be helpful in explaining the nature of the invention.

In general, for a point remote from a light source, the illumination is directly proportional to the source radiance and to the solid angle subtended by that light source from that point.

Figure 4:
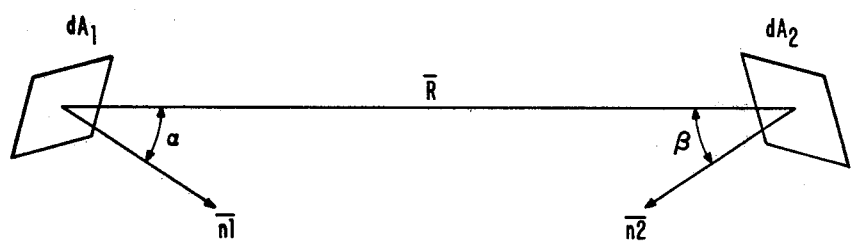
FIG. 4 illustrates a planar light source in arbitary relation with a target area to be illuminated.

Referring to FIG. 4, $(dA_1, \overline{n1})$ specifies a suitably small planar source of radiant energy, and $(dA_2, \overline{n2})$, a target for illumination.

It is known that the relationship of source radiance and target irradiance is governed by $$d^2P_2 = \frac{N_1(\overline{R})dA_1 \; |<\overline{n_1},\overline{R}>| \; dA_2 \; |<\overline{n_2},\overline{R}>|}{|\overline{R}|^4}$$

where $d^2P_2$ is the amount of power received by $dA_2$, and $N_1(\overline{R})$ is the source radiance in the direction of $\overline{R}$. For more details, see Smith, W. J., in a book entitled "Modern Optical Engineering", chapter 8, 1966, McGraw Hill, N.Y.

In the case where $N_1(\overline{R})=N$, the radiance surface is referred to as Lambertian, having the same directional properties as a cavity radiator.

The irradiance produced at $dA_2$ by a Lambertian source at $dA_1$ is $$d^2H = \frac{d^2P_2}{dA_2} = N\cos\beta \frac{dA_1\cos\alpha}{|\overline{R}|^2}$$

Where N is the source radiance and $$\frac{dA_1\cos\alpha}{|\overline{R}|^2}$$

is the solid angle subtended by $dA_1$ from $dA_2$. From the above relationship, it can be seen that more light can be delivered to area 18 if the source radiance is increased. A further gain can be achieved if the solid angle is also increased.

APERTURED FLUORESCENT LAMPS

Fluorescent lamps can be approximated as Lambertian source and are a particularly desirable light source because they are energy efficient and operate at low temperatures. It is known that maximum source radiance can be achieved using an apertured fluorescent lamp. FIG. 3a illustrates such an apertured fluorescent lamp which is coated on the inside of the glass bulb wall 33 with a high reflectant layer 32 (see also FIG. 3b) and a layer of fluorescent material 34, except for a strip that defines the aperture 12 along the length of lamp 10. Stated another way, the strip represents an area within the lamp that is uncoated so as to form a clear aperture 12 along the length of the lamp 10, and from which light emits.

Figure 3C:
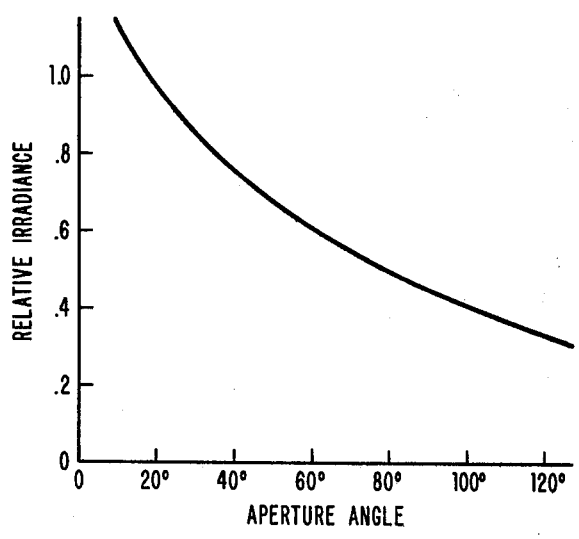

The relative aperture irradiance of such fluorescent lamp is known to vary inversely with the size of the aperture angle 35. For more details, see Levin, R. E., et al, in a paper entitled "Narrow Beam Fluorescent Sources-Design and Applications", presented before the National Technical Conference of the Illuminating Engineering Society, Sept. 10–14, 1967, Montreal, Canada. A typical relationship between these two design parameters is illustrated in FIG. 3c. Thus, to deliver more light to the document area, the aperture irradiance can be increased by reducing the aperture angle 35. As the aperture angle 35 is reduced, the aperture 12 becomes narrower, and the intensity of the light therefrom increases.

In applications where local heat dissipation may be a problem or because of some other packaging constraints, the bulky apertured fluorescent lamp may be placed at a more suitable position away from the target document area. A light guide may be used in those situations to conduct light from the aperture to the target document area. A logical and simple design is a rectangular shape light guide which would permit the use of a fluorescent lamp with a small aperture angle. However, as described above briefly and in more detail hereinafter, a more optimum light guide should also incorporate a larger output window so as to increase the associated subtended solid angle. The latter consideration leads to a light guide design having a trapezoidal cross section.

OPTIMIZED ILLUMINATION SYSTEM DESIGN

The general design approach to a near optimum system design realization is to first develop a performance measure and a computation model and then employ standard search algorithm (to be described hereinafter) suitable for constrained maximization task. We will first consider the physical constraints on the design parameters, which will lead to a performance measure.

Referring to FIG. 3b, for a given lamp tube size, the reduction on the size of the aperture angle 35 is limited by the minimum resolvable feature size of a given manufacturing process. This limitation tends to determine the minimum aperture 12 and therefore the width of the adjacent narrow base 16 of the light guide 14. In practice, apertured fluorescent lamps with ⅛ inch diameter and an aperture angle 15° are available commercially.

Referring to FIG. 1a, the length 21 of the light guide 14, the scan distance 11, and the guide angle 17 are dictated by other constraints, such as the physical dimension of the enclosure, space availability near the document glass area. For a given environment, these parameters are constrained by the specific machine components layout.

Once the design parameters are constrained and the minimum width of narrow base 16 is determined, it remains to select a near optimum width for the wide base 20 of the light guide 14 to maximize the area irradiance. More specifically, the wide base 20 should be increased to the near optimum width to correspondingly enlarge the solid angle 19 subtended by the wide base 20 from points inside the document area.

In general the process of increasing the width of the wide base to increase the associated solid angle to gain improvement does not go unlimited. Keeping the narrow base 16 constant, as the wide base 20 is increased beyond an optimum point, the incident angle will be less than the critical angle, and the incident plane wave will be split into two rays: a transmitted ray proceeding outside the light guide, resulting in light loss, and a reflected ray propagating back into the light guide. Therefore, the design task for a given set of physical constraints is to determine a near optimum maximum width of the wide base so as to achieve a maximum solid angle and not go beyond the point upon which light no longer travels substantially within the light guide via total internal reflection.

It is will known that total internal reflection can occur for a plane electromagnetic wave incident upon a plane boundary between media of differing index or refraction. More particularly, when such wave is incident from the higher index side of the boundary, there is a "critical angle" of incidence computable from Snell's law. For incident angles greater than this "critical angle", all the incident power is reflected and light transmission therein is via total internal reflection.

Figure 1B:
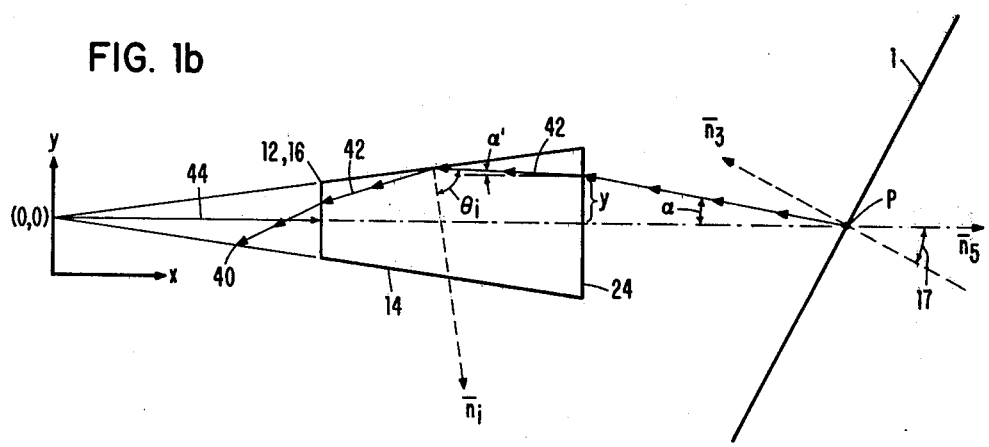
FIG. 1b is a simplified schematic diagram of the illumination system in FIG. 1a showing a light ray traversing the light guide.

Referring to FIG. 1b, a simplified analysis which would provide the desired computation model and performance measure of the illumination system proceeds by subdividing the output window 24, constructing rays to the subdivisions from the point P in the document area, and reflecting these rays to find their direction inside the guide. Rays which are reflected are traced to their intersections with the lamp wall 40 to find a correspondent radiance. The irradiance contribution at the point P by a given subdivision is, using the above planar source relation, $$d^2H(\overline{P}) = \frac{B(W2)\,d\Omega\,(-D\cos\phi + y\sin\phi)}{(Z^2 + (y^2 + D^2))^{\frac{3}{2}}}$$

$$\text{where } d\Omega = \frac{D^2\,dy\,dZ}{(D^2 + y^2 + Z^2)^{3/2}}$$

is the solid angle and D is the scan distance; y is an intercept above the illumination axis upon which a light ray strikes output window 24, and B (W2) is the lamp radiance as a function of W2, the width of the narrow base.

Transmission and reflection losses for each surface intersected must also be considered. Each of the loss terms multiplies the radiance and the results modify the irradiance contribution produced by the particular subdivision.

To consider these transmission and reflection loss terms, refer to FIG. 1b. Aperture 12 of lamp 10 is assumed to coincide with narrow base 1 of light guide 14. The sides of light guide 14 are extended, for the present consideration, to intersect at the origin (0, 0) of the XY axis. Origin (0,0) is the center of the circle of aperture images, which circle has a radius 44 with a value R. The length 21 of light guide 14 has a value L; the width of the narrow base 16 has a value W2 while the same for the wide base 20 is W1. The guide angle 17, with respect to document plane normal $\overline{n}_3$, has a value $\phi$ and the scan distance 11 has a value D.

A light path from point P to the output window 24 intercepts the output window 24 at y unit above the axis, making an angle $$\alpha = \tan^{-1} Y/D$$

with the output window 24 normal $\overline{n}_5$, also defined as the light guide illumination axis.

Upon refraction, the angle inside the guide is $$\alpha' = \sin^{-1}\frac{y}{n\sqrt{D^2 + y^2}}$$

where n is the material index of refraction of the light guide 14. Once the angle inside the guide is determined, the light path 42 inside the guide can also be calculated. More particular, the incidence angles at each reflection points of the path 42 are determined to be, with respect to the surface normal $\overline{n}_i$, $$\theta_i = 90° - (\alpha' + (i-\tfrac{1}{2})\gamma); \quad i=1, 2, \ldots, M$$

where $\alpha'$ is as given before;

$$\gamma = 2\tan^{-1}\frac{W1 - W2}{2L},$$

and M is the number of reflections encountered along the light path.

From these incident angles, the fraction of power reflected at each intersection can be computed as following $$r(\theta_i) = \begin{cases} 1 & \text{if } \theta_i \geq \theta_{crit} \\ \frac{1}{2}\left[\left(\frac{\sin(\theta_i - \theta_i')}{\sin(\theta_i + \theta_i')}\right)^2 + \left(\frac{\tan(\theta_i - \theta_i')}{\tan(\theta_i + \theta_i')}\right)^2\right] & \text{if } \theta_i < \theta_{crit} \end{cases}$$

$\sin \theta_i' = n \sin \theta_i$ and $\sin \theta_{crit} = 1/n$ and where n is the material refractive index of the light guide 14.

The reflective loss at the point of incidence at the output window 24 is given by $$r(\alpha) = \frac{1}{2}\left[\left(\frac{\sin(\alpha - \alpha')}{\sin(\alpha + \alpha')}\right)^2 + \left(\frac{\tan(\alpha - \alpha')}{\tan(\alpha + \alpha')}\right)^2\right]$$

and the fraction of power transmitted is $$t(\alpha) = 1 - r(\alpha)$$

The reflective loss at the input window 23 towards the lamp must also be taken into consideration. The angle of incidence at the inut window 23 is given by $$\theta_e = \alpha' + M\gamma$$

and the associated transmission fraction is $$t(\theta_e) = \begin{cases} 0 & \text{if } \theta_e \geq \theta_{crit} \\ 1 - r(\theta_e) & \text{if } \theta_e < \theta_{crit} \end{cases}$$

The total transmitted fraction along the light path is therefore $$T = t(\alpha) \, t(\theta_e) \prod_{i=1}^{M} r(\theta_i)$$

The irradiance contribution at point 40 is therefore modified $$d^2H(\overline{P}) = \frac{D^2(-D\cos\phi + y\sin\phi) B(W2) T(y) \, dy \, dZ}{(Z^2 + (y^2 + D^2))^2}$$

The total irradiance is found by integration over all the subdivisions on the output window 24

$$H(\overline{P}) = \frac{\pi B(W2)D^2}{2} \int_{-\frac{W1}{2}}^{\frac{W1}{2}} \frac{T(y)(-D\cos\phi + y\sin\phi) \, dy}{(y^2 + D^2)^{3/2}}$$

The integration with respect to y does not in general have a closed form solution, numerical approximation is generally required.

The last relation defines the performance measure upon which maximization is to be performed. More specifically, finding an optimum illuminating system requires a search of the allowable space (W1, W2, L, D, $\phi$), and finding a set of near optimum design parameters which maximize H (P).

Such an optimization process begins with an arbitrary point in the (W1, W2, L, D, $\phi$) quintuple space. The total irradiance at that point is first calculated and the direction of maximum ascent at that point of the quintuple space is then determined. Along the direction of maximum ascent, a more optimum point is selected, which in turn can be used to calculate the total irradiance and a new direction of maximum ascent. This maximization process continues until a near optimum set of parameters for the given set of physical constraints is selected.

The aforesaid optimization technique is well known. A number of standard algorithms are known to one skilled in the art, and described by Wilmuth, R. J. in "The Computation of Fixed Points", A Doctoral Dissertation, Dept. of Operations Research, Stanford University, July 1973, and described by Luenberger, D. C., in a book entitled "Introduction to Linear and Non-Linear Programming", Addison-Wesley, MA 1973. These standard algorithms can be used to perform the maximization once the physical constraints, computation model and the performance measure are specified.

In order to demonstrate the advantage and improvement made possible using a trapezoidal shape light guide according to the present invention, several light guide designs and their performance from experimental results are set forth in Table 1.

Example I is a rectangular shape light guide and it serves as a bench mark for comparison. Example II is a trapezoidal shape light guide having a wider W1 base. Measurement results of this light guide show an improvement of about +31.6%. Example III has the same light guide as in Example II except that the aperture angle of the fluorescent lamp has been reduced from 45° to 30°. Measurement results show this design gives about 50% more light over that of the bench mark.

In a preferred embodiment for application in a photocopier, the specific machine components layout imposes constraints on the allowable dimensions of the light guide and the illumination system as a whole. The physical constraints in this particular illustrative embodiment (refer to FIG. 1a) are specified by the following:

1. The minimum distance 5 must exceed 2 mm.
2. Point 7 of the light guide must not interfere with viewing cone 3.
3. Length 6 must not exceed 114 mm.
4. The aperture angle less 5° (mfg. tolerance) must exceed (W2)/(2$\pi$r)×360°, where r=bulb radius.
5. All parameters greater than zero.
6. The guide angle $\phi$ is such $0° < \phi < 90°$.
7. The aperture angle must be between 15°. and 120°.
8. Document glass thickness 8 is 6 mm.

For this illustrative embodiment, a trapezoidal shape light guide, which fits the aforestated constraints but has not been optimized, is illustrated in Example IV. Experimental results using this design show an improvement of about +60.5% over the bench mark.

Example V shows an optimized design for the preferred embodiment in accordance with the present invention. Simulation results show an improvement of about +82.9% over the bench mark.

Although the light guide 14 in FIG. 1a is shown and described to be a rigid wedge and having a trapezoidal cross section, it is possible to have the light guide 14 made of resilient material. A light guide made of such material would have the added advantage of flexibility which could better accommodate machine components layout.

From the preceeding detailed description of applicants' invention, it will be seen that document scanners incorporating such illumination apparatus have advantages heretofore not been possible to achieve. In addition to the variation and modification to applicants' disclosed apparatus which have been suggested, many other variations and modifications will be apparent to those skilled in the art, and accordingly, the scope of applicants' invention is not to be construed to be limited to the particular embodiment shown or suggested.

TABLE 1

| | GUIDE ANGLE $\phi$ (degree) | WIDE BASE W1 (mm) | SCAN DISTANCE D (mm) | NARROW BASE W2 (mm) | LENGTH L (mm) | APERTURE ANGLE $\alpha$ (degree) | NORMALIZE IRRADIANCE MEASURED | PERFORMANCE IMPROVEMENT (%) |
|---|---|---|---|---|---|---|---|---|
| Example I (Rectangular) | 25 | 6.35 | 12.7 | 6.35 | 57.15 | 45 | 76 | — |
| Example II | 25 | 11.43 | 12.7 | 6.35 | 57.15 | 45 | 100 | +31.6 |
| Example III | 25 | 11.43 | 12.7 | 6.35 | 57.15 | 30 | 114 | +50 |
| Example IV | 22.5 | 5.59 | 9.9 | 4.19 | 44.45 | 20 | 122 | +60.5 |
| Example V | 30.6 | 8.026 | 11.63 | 4.59 | 93.2 | 23 | *139 | +82.9 |

*Simulation Result

We claim:

1. An illumination apparatus for a document scanner comprising:
   a fluorescent lamp for illuminating a document to be scanned, said lamp having an aperture defined by an aperture angle and a radiance determined by said aperture angle; and
   light conducting means, having a trapezoidal longitudinal cross section, for guiding light therethrough by way of substantial total internal reflection and through said aperture to an area of said document, the narrow base of said trapezoidal shape positioned adjacent said aperture and an output window associated with the wide base of the trapezoidal shape directed towards the document area to be scanned wherein said wide base is at a scan distance from a point in said area so that said point forms a subtended solid angle with said output window,
   wherein the width of said wide base is increased to correspondingly increase said solid angle,
   wherein said light conducting means includes an illumination axis forming a guide angle with the document plane normal at a point of intersection with said document,
   wherein a set of design parameters including said guide angle, said scan distance, said narrow base, said wide base, and the length of said light conducting means are selected so as to maximize the product of the lamp radiance and said solid angle,
   wherein the design parameter selection is performed so as to maximize the total irradiance function $H(\bar{p})$,
   wherein the function $H(\bar{p})$ is an integral equation of the form $$H(\bar{p}) = \frac{\pi B(W2) D^2}{2} \int_{-W\frac{1}{2}}^{W\frac{1}{2}} \frac{T(y)(y\sin\phi - \cos\phi) dy}{(y^2 + D^2)^{3/2}}$$

and wherein B(W2) is the fluorescent lamp radiance as a function of W2, W2 is the width of said narrow base, D is the scan distance, W1 is the width of said wide base, T(y) is the total transmitted fraction of a light ray along a light path from said document area to said lamp aperture traversing said light conducting means, y is an intercept above the illumination axis upon which a light ray strikes said output window of said light conducting means, $\phi$ is the guide angle, and $\pi$ is the constant 3.1415 ..., whereby the amount of light delivered to said area is maximized.

2. An illumination apparatus as set forth in claim 1 wherein said light conducting means is made of glass.

3. An illumination apparatus as set forth in claim 1 wherein said light conducting means is made of acrylic plastic.

* * * * *